United States Patent [19]

Nakamura et al.

[11] Patent Number: 4,600,521

[45] Date of Patent: Jul. 15, 1986

[54] ELECTRON-BEAM REACTIVE MAGNETIC COATING COMPOSITION FOR MAGNETIC RECORDING MEDIA

[75] Inventors: Eitaro Nakamura, Tokyo; Kotaro Hata, Ichikawa; Makoto Yamamoto, Hiratsuka, all of Japan

[73] Assignee: Nippon Zeon Co., Ltd., Tokyo, Japan

[21] Appl. No.: 784,660

[22] Filed: Oct. 4, 1985

[30] Foreign Application Priority Data

Oct. 9, 1984 [JP] Japan ................ 59-211645
Oct. 31, 1984 [JP] Japan ................ 59-229657

[51] Int. Cl.$^4$ ............................................ C04B 35/04
[52] U.S. Cl. ................................. 252/62.54; 252/65.51; 428/329; 428/694; 428/900; 526/240; 526/273; 525/287; 525/291; 525/292; 525/301
[58] Field of Search ............... 252/62.54, 62.53, 62.52, 252/62.51

[56] References Cited

U.S. PATENT DOCUMENTS

| | | | |
|---|---|---|---|
| 4,420,531 | 12/1983 | Tokuda | 252/62.54 |
| 4,435,485 | 3/1984 | Nakajima et al. | 252/62.54 |
| 4,448,846 | 5/1984 | Chang et al. | 252/62.54 |
| 4,529,661 | 7/1985 | Ninomiya et al. | 252/62.54 |
| 4,556,611 | 12/1985 | Nakajima | 252/62.54 |

FOREIGN PATENT DOCUMENTS 3413079 10/1984 Fed. Rep. of Germany ... 252/62.54

*Primary Examiner*—Arthur P. Demers
*Attorney, Agent, or Firm*—Sherman and Shalloway

[57] ABSTRACT

An electron-beam reactive magnetic coating composition for use in magnetic recording media comprising a magnetic powder and a polymer resin as a binder therefor, the polymer resin containing vinyl chloride as a main component and having at least one hydrophilic group selected from the group of COOM, $SO_3M$, $SO_4M$, $PO_3M_2$ and $PO_4M_2$ (wherein M represents hydrogen, an alkali metal or ammonium) and not more than 10,000 double bond equivalents of an unsaturated acid ester group.

13 Claims, No Drawings

ELECTRON-BEAM REACTIVE MAGNETIC COATING COMPOSITION FOR MAGNETIC RECORDING MEDIA

This invention relates to a magnetic coating composition, particularly to a magnetic coating composition for magnetic recording media comprising a magnetic powder and as a binder therefor a vinyl chloride polymer resin which is crosslink-cured by the electron-beam radiation.

Magnetic recording media such as magnetic tapes or cards are generally produced by coating a magentic coating composition comprising a magnetic powder and a binder therefor on a substrate such as a polyester film to form a magnetic layer thereon. In recent years, finely pulverized magnetic powders having a high specific surface area have come into use as such a magnetic powder in an attempt to increase coercivity and maximum saturation magnetization and to improve S/N ratios and recording density.

However, when ordinary binders such as a vinyl chloride/vinyl acetate/vinyl alcohol terpolymer, a vinyl chloride/vinyl acetate/maleic acid terpolymer or nitrocellulose are used for such finely pulverized magnetic powders, there are disadvantage that the viscosity of the magnetic coating composition becomes high during preparation, or that the magnetic powder has insufficient dispersibility. A low-molecular-weight surface-active agent is used as a dispersant in order to improve the dispersibility of the magnetic powder. The amount of the dispersant that can be used is limited because when used in large amounts, it will reduce the durability of the resulting magnetic recording medium or cause contamination of a recording head.

On the other hand, in order to increase the durability, running property and reliability of the magnetic recording media, attempts are generally made, especially for the magnetic video-recording media, to add a flexible material such as a polyurethane resin, a polyester resin or acrylonitrile/butadiene rubber and to crosslink the magnetic layer by adding a heat-curing crosslinking agent such as a polyisocyanate compound to a magnetic coating composition to thereby perform a chemical reaction with a group having active hydrogen such as hydroxyl group, carboxyl group or amino group contained in the binder.

However, use of such heat-curing type binder poses a problem of the pot life of the magnetic coating composition, since the curing reaction starts as soon as the crosslinking agent is added. Moreover, the curing speed fluctuates depending on the materials of the magnetic coating composition and the environment, and it is difficult to control the curing speed. This leads to other problems of stability of the coating composition in storage and inconstant treating effect on the surface formed of the coated film. Furthermore, it takes a long period of time until the curing is completed. Consequently, during the cure-aging, the surface of the coated film is susceptible to transfer of roughness of the back surface of the substrate which contacts with the surface of the coated film so that the magnetic layer tends to be reduced in its smoothness, which is one of the important properties of the high density recording medium.

It is seen from the problems described above that the conventional heat-curing type binder has its limit to meet the demands for a distinct improvement in the high density recording ability of the magnetic recording media, and for the stabilization, rationalization and automation of the production process.

The present inventors have made extensive investigations in order to develop a binder which can meet the higher performance of the magnetic recording media and the rationalization and stabilization of the production process, and have found that the use of a specified vinyl chloride resin can give a magnetic coating composition which maintains high dispersibility, is free from increase in viscosity, and is crosslinking-cured in an instant by a radiation of the electron beam, and that a magnetic recording medium obtained by using this magnetic coating composition has good surface smoothness and durability of the coated film and excellent running property, magnetic properties and electromagnetic converting characteristics.

According to this invention, there is provided an electron-beam reactive magnetic coating composition for a magnetic recording media, which comprises a magnetic powder and as a binder therefor a polymer resin containing vinyl chloride as a main component and having at least one hydrophilic group selected from $COOM$, $SO_3M$, $SO_4M$, $PO_3M_2$ and $PO_4M_2$ (wherein M represents hydrogen, an alkali metal or ammonium; this definition is also applicable hereinafter.) and not more than 10,000 double bond equivalents of an unsaturated acid ester group. The "double bond equivalent" means a molecular weight of the polymer based on one unsaturated ester group bonded to the polymer.

The resin of this invention can be generally obtained by reacting a vinyl chloride polymer having at least one hydrophilic group selected from $COOM$, $SO_3M$, $SO_4M$, $PO_3M_2$ and $PO_4M_2$ and an epoxy group with an unsaturated acid of not more than 3.5 of pKa which shows an acid strength.

The vinyl chloride polymer having at least one hydrophilic group selected from $COOM$, $SO_3M$, $SO_4M$, $PO_3M_2$ and $PO_4M_2$ and an epoxy group can be prepared by various methods. For example, there are (1) a method wherein vinyl chloride is copolymerized with a radical-polymerizable monomer having the said hydrophilic group, a monomer having the epoxy group, and as required, another monomer copolymerizable with these, (2) a method wherein vinyl chloride is copolymerized with a monomer having the epoxy group, and as required, another monomer copolymerizable with these in the presence of a radical generator having the said hydrophilic group, and (3) a method wherein an epoxy group-containing vinyl chloride polymer obained by copolymerizing a monomer having the epoxy group, vinyl chloride, and as required, another monomer or an epoxy-group containing vinyl chloride polymer obtained by dehydrochlorinating a vinyl chloride polymer, and then, epoxidizing the resulting polymer by an epoxidizing agent such as percarboxylic acid is subjected to partial addition reaction with a compound having the said hydrophilic group. It is possible to employ these methods in combination.

Examples of the monomers having the epoxy group which are commonly used in the production of the vinyl chloride polymer having both the hydrophilic group and the epoxy group include glycidyl ethers of unsaturated alcohols such as allylglycidyl ether and methallylglycidyl ether; glycidyl esters of unsaturated acids such as glycidylacrylate, glycidylmethacrylate, glycidyl-p-vinylbenzoate, methyl glycidylitaconate, glycidylethylmaleate, glycidylvinylsulfonate and glycidyl(meth)allylsulfonate; and epoxide olefins such as butadiene monooxide, vinylcyclohexene monooxide and 2-methyl-5,6-epoxyhexene.

The radical-polymerizable monomers having the hydrophilic group used in the method (1) mentioned above are exemplified below. Examples of monomers having COOM include unsaturated monocarboxylic acids such as acrylic acid and methacrylic acid; unsaturated dicarboxylic acids such as fumaric acid and itaconic acid, and monoesters of these. Examples of monomers having $SO_3M$ are acids such as vinylsulfonic acid, methylvinylsulfonic acid, (meth)allylsulfonic acid, styrenesulfonic acid, ethyl (meth)acrylate-2-sulfonate, 2-acrylamide-2-methylpropanesulfonic acid, 3-allyloxy-2-hydroxypropanesulfonic acid, and alkali metal and ammonium salts of these. Examples of monomers having $SO_4M$ are acids such as ethyl (meth)-acrylate-2-sulfate, 3-allyoxy-2-hydroxypropanesulfuric acid, and alkali metal and ammonium salts of these. Examples of monomers having $PO_4M_2$ are acids such as propyl (meth)acrylate-3-chloro-2-phosphate, ethyl (meth)acrylate-2-phosphate, 3-allyloxy-2-hydroxypropanephosphate, and alkali metal and ammonium salts of these. Examples of monomers having $PO_3M_2$ include acids such as vinylphosphonic acid, acrylamidemethanephosphonic acid, ethyl 2-phosphonate-(meth)acrylate, 3-allyoxy-2-hydroxypropanephosphonic acid, and alkali metal and ammonium salts of these.

The radical-generators having the hydrophilic group used in the method (2) are exemplified as follows: 4,4-azobis-4-cyanovaleric acid is used as examples for the radical-generator having COOM; potassium persulfate and ammonium persulfate for $SO_4M$; and potassium perphosphate and sodium perphosphate for $PO_4M_2$.

The compounds that may be used for introducing the hydrophilic group into the epoxy group-containing vinyl chloride polymer by addition reaction in the method (3) are exemplified below. For example, compounds having COOM include malonic acid and phthalic acid; compounds having $SO_3M$, sodium sulfite, ammonium sulfite, sodium bisulfite, potassium bisulfite, ammonium thiosulfate, sodium aminoethanesulfonate, sodium sulfanilate and sodium sulfaminate; compounds having $SO_4M$, sodium persulfate, ammonium persulfate and sodium 2-aminoethylsulfate; compounds having $PO_3M_2$, sodium hydrogenphosphite and ammonium hydrogenphosphite; and compounds having $PO_4M_2$, dipotassium hydrogenphosphate and disodium hydrogenphosphate.

Examples of monomers other than the monomers having the epoxy group, vinyl chloride and the monomers having the hydrophillic group, which may be used as required in this invention, include vinyl esters of carboxylic acids such as vinyl acetate and vinyl propionate; vinyl ethers such as methyl vinyl ether, isobutyl vinyl ether and cetyl vinyl ether; vinylidene halides such as vinylidene chloride and vinylidene fluoride; esters of unsaturated carboxylic acids such as diethyl maleate, butylbenzyl maleate, dimethyl itaconate, di-2-hydroxyethyl maleate, methyl (meth)acrylate, ethyl (meth)acrylate, lauryl (meth)acrylate and 2-hydroxypropyl (meth)acrylate; unsaturated nitriles such as (meth)acrylonitrile; olefins such as ethylene and propylene; and aromatic vinyl compounds such as styrene, alphamethylstyrene and p-methylstyrene. These monomers are properly chosen in order to increase the solubility of a mixture of the polymer resin of this invention with another resin while regulating the compatibility of these resins with each other and their softening points, or to improve the properties of the coated film or the coating process.

A broad range of various known polymerization methods can be employed for copolymerizing the monomer having the epoxy group and vinyl chloride or for copolymerizing the monomer having the epoxy group, the monomer having the hydrophilic group, vinyl chloride and optionally, another monomer. The partial addition reaction of the compound having the hydrophilic group with the monomer having epoxy group, vinyl chloride and as required, another monomer may be performed by any of known suitable methods depending on properties of the starting materials or the production process such as separation of the products.

The vinyl chloride polymer having at least one hydrophilic group selected from COOM, $SO_3M$, $SO_4M$, $PO_3M_2$ and $PO_4M_2$ and the epoxy group thus obtained should contain above 0.5% by weight of the epoxy group. If it is less than 0.5% by weight, the amount of the unsaturated acid ester group bonded to the polymer becomes small and the crosslinking reaction by radiation of the electron beam tends to be insufficient. Hence, the durability of the magnetic layer formed by radiation of the electron beam is insufficient.

It is necessary that the unsaturated acid to be reacted with the vinyl chloride polymer having the hydrophilic group and the epoxy group be a strong acid of not more than 3.5 of pKa which shows the strength of acid. If a weak acid of above 3.5 of pKa is used, the reaction must be performed at a higher temperature or for a longer period of time or by joint use of a quaternary ammonium salt, because the addition reaction with the epoxy group does not readily proceed under the mild conditions. However, since the vinyl chloride polymer is liable to undergo dehydrochlorination owing to heat, the dehydrochlorination of the polymer and the addition reaction of hydrogen chloride to the epoxy group proceed earlier than the desired reaction modifying the unsaturated acid to its ester. Consequently, the object modified product can not be obtained effectively, and the vinyl chloride polymer is degraded so that the heat stability of the resin formed is drastically reduced.

It is defined that unsaturated acids of not more than 3.5 of pKa used in this invention include acids in which a hydrogen atom other than the acidic group is substituted with other element.

Examples of the unsaturated acids are (i) monobasic unsaturated acids, for example, halogen substituted (meth)acrylic acids such as chloroacrylic acid; unsaturated sulfonic acids such as vinylsulfonic acid, methylvinylsulfonic acid, (meth)allylsulfonic acid, styrenesulfonic acid, ethyl (meth)acrylate-2-sulfonate, 2-acrylamide-2-methylpropanesulfonic acid and 3-allyloxy-2-hydroxypropanesulfonic acid; unsaturated monoesters of sulfuric acid such as ethyl (meth)acrylate-2-sulfate and 3-allyloxy-2-hydroxypropanesulfuric acid; unsaturated diesters of phosphoric acid such as di-2-(meth)acryloxyethyl acid phosphate; and (ii) polybasic unsaturated acids, for example, maleic acid, citraconic acid, fumaric acid, mesaconic acid, endomethylene-tetrahydrophthalic acid, methyl cyclohexene dicarboxylic acid and itaconic acid, especially maleinic acid.

The reaction of the vinyl chloride polymer having the hydrophilic group and the epoxy group with the unsaturated acid of not more than 3.5 of pKa proceeds readily under relatively mild condition of from room temperature to 80° C. in a solvent dissolving both the above compounds. If the unsaturated acid dissolves in the polymer, these compounds may be directly kneaded and reacted on a Bambury's mixer or a roller. In either case, it is desirable that the unsaturated acid is used in an amount less than the equimolar amount of the epoxy group contained in the vinyl chloride polymer. If the unreacted unsaturated acid is used in an amount in excess, it remains in the polymer. This leads to disadvantages such as increase of the hydroscopic property and occurrence of metal corrosiveness of the resulting resin, and furthermore, invites a reaction of a hydrophilic group with an epoxy group in the vinyl chloride polymer, with the consequence that the resin formed might be not dissolved. Generally, in the reaction, the polymerization-inhibiting agent such as hydroquinone, hydroquinone monomethyl ether and t-butyl catechol is added in a practical amount.

In the method (3) which is hereinbefore given as an example of the production of a vinyl chloride polymer having at least one hydrophilic group selected from COOM, $SO_3M$, $SO_4M$, $PO_3M_2$ and $PO_4M_2$ and an epoxy group, the resin in accordance with this invention can be directly obtained by using, as a compound having the hydrophilic group, (a) a polybasic unsaturated acid and/or (b-1) monobasic unsaturated acid and (b-2) polybasic saturated acid, pKa of these acids being not more than 3.5. Examples of the polybasic unsaturated acids (a) and monobasic unsaturated acids (b-1) and the same as those mentioned as examples of the unsaturated acids of not more than 3.5 of pKa. Examples of the polybasic saturated acids (b-2) include polycarboxylic acids such as malonic acid, succinic acid, phthalic acid and trimellitic acid; and sulfocarboxylic acids such as sulfobenzoic acid and sulfosalicylic acid, and the pKa of the polybasic saturated acids is preferred to be not more than 3.5.

The polybasic unsaturated acid (a) and the polybasic saturated acid (b-2) are preferred that the second dissociation constant ($pKa_2$) of the acid is more than 4.2. If the $pKa_2$ of the acid is less than 4.2, two acid groups react with the epoxy group during modification reaction and the resin is gelled by crosslinking. Consequently, it is likely to lead to the loss of the solvent solubility necessary as the coating resin and the lack of the dispersibility of the magnetic powder.

When the polybasic saturated acid (b-2) is not used, the resulting resin has a poor dispersibility of the magnetic powder because of lack of the bonded acid groups.

The reaction of (a) the polybasic unsaturated acid and/or (b-1) the monobasic unsaturated acid and (b-2) polybasic saturated acid with the epoxy group-containing vinyl chloride polymer can be performed in the same way as the reaction of the vinyl chloride containing the hydrophilic group and the epoxy group with the unsaturated acid of not more than 3.5 of pKa.

The resin of the present invention thus obtained has an average degree of polymerization of 100 to 900, preferably 200 to 500, and a vinyl chloride content of at least 60% by weight. If the degree of polymerization is not more than 100, the abrasion resistance of the magnetic layer is insufficient, even if crosslinking by the electron beam is performed. If it exceeds 900, the viscosity of the coating composition is high and the dispesibility of the magnetic powder in it tends to be insufficient. When the content of the vinyl chloride is less than 60% by weight, the compatibility of the resin with a flexible material is reduced, or the separation of the solvent from the coated film is remarkably reduced.

The amount of the hydrophilic group bonded to the resin should be 0.1 to 4.0% by weight, as —COO, —$SO_3$, —$SO_4$, —$PO_4$ to —$PO_3$. If it is less than 0.1% by weight, the dispersibility of a magnetic powder in the coating is poor. If it exceeds 4.0% by weight, the resin has increased hydrophilicity and insufficient solubility in solvents, and the moisture resistance of a coated film formed from it is reduced, or the magnetic powder aggregates and its dispersibility becomes poor.

In the resin in accordance with the present invention, there are electron-beam curable double bonds introduced in a form of vic-glycol monoester of unsaturated acid. Hence, the resin can be crosslinked with chlorohydrin formed during the reaction; and also with the isocyanate compound. The amount of the double bonds contributive to the electron beam curing should be not exceeding 10,000 double bond equivalents. If the amount of the double bonds is as small as above 10,000 double bond equivalents, the running property and the durability of the magnetic layer after the radiation of electron beam are insufficient.

The resin of this invention, as in the case of ordinary vinyl chloride resin binders for magnetic coating, is used as the binder together with a flexible material such as a polyurethane resin, polyester resin or acrylonitrile-butadiene copolymer and/or another material such as a resin, an oligomer or an monomer having at least one electron beam reactive unsaturated bond, and the object coating composition can be prepared by mixing the binder components, a magnetic powder, and as required, other known materials such as a lubricant, a dispersant, an antistatic agent and an abrasive agent, and dispersing the resulting mixture in a suitable solvent.

If desired, the resin in accordance with the present invention may be used in combination with an ordinary resin binder for magnetic coating, such as a vinyl chloride/vinyl acetate/maleic acid copolymer resin, a vinyl chloride/vinyl alcohol/vinyl acetate copolymer resin, a cellulosic resin, a phenoxy resin, amino resin, an epoxy resin, a butyral resin and an acrylic resin within the range in which the purpose of this invention can be achieved.

Magnetic powder that can be used in this invention is a magnetic metal powder such as a powder of Fe and a powder of Co., and powders of iron oxides such as gamma-$Fe_2O_3$, $Fe_3O_4$, Co-containing gamma-$Fe_2O_3$, Co-containing $Fe_3O_4$ and barium ferrite may be also used.

As the activated energy beam used for curing the magnetic coated film prepared from the resin of the invention, used is an electron beam by means of the electron accelerator from the standpoint of easy control of the absorbed dose and easy introduction of it to the production process. By using an electron accelerator of 100 to 750 KV, preferably 150 to 300 KV, of accelerated voltage, the electron beam is radiated in an absorbed dose of 0.5 to 20 Mrad to cure the magnetic coated film.

The following examples illustrate the present invention more specifically. All part and percentage in these examples are by weight. In the following, the vinyl chloride content was determined by measuring the amount of chlorine generated by burning. The double bond equivalent and the epoxy group content were determined by titration, and the hydrophilic group content was determined by elemental analysis, titration and infrared absorption spectroscopy in combination.

EXAMPLE 1

A vinyl chloride copolymer comprising the epoxy group content of 4%, the —$SO_4$ content of 0.5% and the vinyl chloride content of 82% was prepared by emulsion polymerization of allylglycidyl ether and vinyl chloride, using potassium persulfate as a radical generator. 100 Parts of this copolymer, 7 parts of 2-acrylamide-2-methylpropanesulfonic acid and 0.01 part of hydroquinone monoethylether were dissolved in 200 parts of dimethylformamide, and the solution was mixed with stirring at 65° C. for 3 hours. The reaction solution was poured dropwise into a large amount of water, and a resin was recovered. The resulting resin was thoroughly cleansed by repeated water- and hot water-washings with strong stirring, and dried to give a resin (A).

EXAMPLE 2

A resin (B) was prepared by operating in the same way as in Example 1 except that alpha-chloroacrylic acid (pKa 2.5) was used instead of 2-acrylamide-2-methylpropanesulfonic acid.

EXAMPLE 3

A vinyl chloride copolymer comprising the epoxy group content of 3%, the —$SO_3$ content of 0.5% and the vinyl chloride content of 72% was prepared by polymerization of glycidyl methacrylate, sodium styrenesulfonate, vinyl acetate and vinyl chloride in methanol, using azobisisobutyronitrile as a radical generator. This copolymer (100 parts), 10 parts of di-2-acryloxyethyl-acid phosphate (pKa 2.3) and 0.015 part of hydroquinone monomethyl ether were mixed in a high-speed mixer, and then, kneaded at 90° C. for 10 minutes by means of a kneading roller. The resulting sheet-like product was pulverized with water in a high-speed stirrer and, after thorough cleansing by repeated hot-water washings, dried to give a resin (C).

EXAMPLE 4

A vinyl chloride copolymer comprising the epoxy group content of 3.5%, the —COO content of 0.9% and the vinyl chloride content of 78% was prepared by suspension polymerization of butadienemonoxide, glycidylmethacrylate, vinyl acetate and vinyl chloride, using lauroyl peroxide as a radical generator, and then, carboxy-modifying the resulting copolymer with malonic acid. 100 Parts of this copolymer was subjected to the same operation as in Example 1 to obtain a resin (D).

COMPARATIVE EXAMPLE 1

A resin (E) was prepared by operating in the same way in Example 1 except that acrylic acid (pKa 4.2) was used instead of 2-acrylamide-2-methylpropane sulfonic acid.

COMPARATIVE EXAMPLE 2

A vinyl chloride copolymer comprising the epoxy group content of 3.7% and the vinyl chloride content of 77% was prepared in the same manner as in Example 3 except that sodium styrenesulfonate was not used. This copolymer was subjected to the same operation as in Example 3 to obtain a resin (F).

COMPARATIVE EXAMPLE 3

A vinyl chloride copolymer comprising the epoxy group content of 0.4%, the —$SO_3$ content of 0.5% and the vinyl chloride content of 84% was prepared in the same manner as in Example 3 except that the amount used of glycidyl methacrylate was reduced. The copolymer was subjected to the same operation as in Example 3 to give a resin (G).

COMPARATIVE EXAMPLE 4

A flask with four inlets having a volume of 3 litres was charged with 100 parts of commecially available vinyl chloride/vinyl acetate/vinyl alcohol terpolymer, 150 parts of toluene and 80 parts of cyclohexanone, and the content was dissolved by heating. After raising the temperature to 80° C., 8 parts of 2-hydroxyethyl methacrylate adduct of tolylene-diisocyanate was added. Subsequently, 0.0015 part of tin octylate and 0.0015 part of hydroquinone were added. The reaction was continued at 80° C. in $N_2$ stream until the reaction ratio reached at 90%. After the reaction, the reaction product was cooled, and diluted with 100 parts of methyl ethyl ketone to obtain a resin (H).

The properties of the resins obtained in Examples 1 to 4 and Comparative Examples 1 to 4 are tabulated in Table 1. The properties of commercial vinyl chloride/vinyl acetate/maleic acid terpolymer (I) (Comparative Example 5) and vinyl chloride/vinyl acetate/ vinyl alcohol terpolymer (J) (Comparative Example 6) are also tabulated in Table 1.

Magnetic coating composition and magnetic recording media produced by using these resins were tested and evaluated for their properties. The results are shown in Table 1. The evaluation methods were as follows:

(1) Solubility

A solution composed of 100 parts of the vinyl chloride resin, 200 parts of methyl ethyl ketone and 200 parts of toluene was prepared. The transparency of the solution was visually observed, and evaluated on a scale of the three grades. O: completely dissolved (transparent), Δ: imperfectly dissolved (opaque), and X: swollen without dissolution (opaque).

(2) Heat stability

The vinyl chloride resin (1.0 g) was taken into a 15 cc test tube, and its opening portion was stopped by an absorbent cotton holding Congo Red test paper. The test tube was placed in a oil bath at 150° C., and the time which elapsed until the Congo Red test paper changed in color by generated HCl was measured.

(3) Dispersion stability

A mixture composed of 400 parts of a magnetic metallic iron powder, 100 parts of the vinyl chloride resin, 300 parts of methyl ethyl ketone, 300 parts of methyl isobutyl ketone and 300 parts of toluene was treated with high-speed shear for 90 minutes. The resulting dispersion coating was taken into a sample bottle, and stored in a constant temperature bath at 25° C. The state of occurence of a gel was observed. The occurence of a gel was determined by taking out a portion of the dispersed coating on a glass plate, diluting it with about 5 times its amount of methyl ethyl ketone, and observing the dilution visually while stirring it with a glass rod. The evaluation was expressed on a scale of O(none), Δ (small amount of gel formed), and X (large amount of gel formed).

(4) Gloss

A mixture composed of 400 parts of a magnetic metallic iron powder, 70 parts of the vinyl chloride resin, 30 parts of a polyurethane resin (Nippolan, a product of Nippon Polyurethane Industry Co., Ltd.), 300 parts of methyl ethyl ketone, 300 parts of methyl isobutyl ketone, 300 parts of toluene and 2 parts of silicone oil was treated with high-speed shear for 90 minutes. The resulting magnetic coating composition was coated on a polyester film to a thickness of 5 micrometers, subjected to a magnetic field orientation treatment, and dried. The reflectance of the magnetic coated layer at a reflectance angle of 60° was measured by a glossmeter. As to the resin (J), after the above high-speed shearing treatment for 90 minutes, 20 parts of polyisocyanate (Coronate L, a product of Nippon Polyurethane Industry Co., Ltd.) was further added, and the dispersion was conducted for additional 10 minutes. The resulting magnetic coating composition was tested in the same way as above.

(5) Pot life

The magnetic coated layer was passed through a calender roll at a line pressure of half times the usual pressure, and the reflectance of the above-treated film at a reflectance angle of 60° was measured by a glossmeter. Separately, the magnetic coated film which was standed for one week under conditions of a temperature of 23° C. and a relative humidity of 50% was calender-treated under the same condition as above, and then, its gloss was measured in the same way as above. The gloss preserving ratio was calculated from both the above gloss values, and expressed on a scale of O (excellent, above 95%), Δ (good, 80-95%), and X (fairly good, below 80%).

(6) Squareness ratio (Br/Bm)

The magnetic coated layer used in the measurement of gloss was cut out in a size of 12.5 mm×50 mm to prepare a sample, and the squareness ratio of the sample was measured by a magnetic characteristic measuring device.

(7) Durability and crosslinking property

The magnetic coated layer used in the measurement of gloss was smoothed by a calender roll, and cured by a radiation of the electron beam in an $N_2$ atmosphere under the conditions of accelerated voltage of 168 KV and radiation amount of 10 Mrad by using an electrocurtain type electron beam accelerating device made by ESI Company. It was then kept in contact under a load of 100 g with a rotating drum having abrasive paper attached to its surface. The drum was rotated at a speed of 150 rpm, and the amount of the magnetic coating composition adhering the abrasive paper at this time was visually observed and expressed on a scale of O (none or little adhesion), Δ (some adhesion), and X (much adhesion).

A portion of the cured coated layer was taken, and rubbed with an absorbent cotton holding methyl ethyl ketone. The fall of the cured coating was visually observed and the evaluation of the crosslinking property was expressed on a scale of O(excellent, no falling of coating), Δ (good, the cotton became soiled), and X (not good, the coating fell).

As to the coated layer obtained from the resin (J), it was heat-treated at 65° C. for 65 hours instead of the electron beam radiation.

(8) Running property

Like a measurement of durability, the cured coated layer was kept in contact with a rotating drum, and the force generated between the coated layer and the rotating drum was measured by a U gauge in an atmosphere kept at a temperature of 65° C. and a relative humidity of 80%. The force is used as a measure of running resistance and expressed on a scale of O (excellent, small), Δ (good, medium), and X (not good, large).

TABLE 1

| | | Example | | | | Comparative example | | | | | |
|---|---|---|---|---|---|---|---|---|---|---|---|
| | | 1 | 2 | 3 | 4 | 1 | 2 | 3 | 4 | 5 | 6 |
| Properties of the resin | Sample | A | B | C | D | E | F | G | H | I | J |
| | Vinyl chloride (wt. %) | 81 | 82 | 70 | 77 | 82 | 76 | 84 | 90 | 86 | 91 |
| | Hydrophilic group (wt. %) | 0.4 | 0.4 | 0.5 | 0.9 | 0.4 | — | 0.5 | — | 0.8 | — |
| | Double bond equivalent | 2,600 | 1,900 | 2,200 | 3,200 | >50,000 | 1,900 | 20,000 | 4,000 | — | — |
| | Degree of polymerization | 260 | 270 | 320 | 350 | 260 | 300 | 430 | 430 | 400 | 430 |
| Properties of the magnetic coating composition or magnetic recording medium | Solubility | O | O | O | O | O | O | X | O | O | O |
| | Heat stability (min.) | 35 | 30 | 25 | 30 | 42 | 28 | 18 | 5 | 15 | 6 |
| | Dispersion stability | O | O | O | O | O | X | Δ | X | X | X |
| | Gloss (%) | 92 | 90 | 87 | 83 | 93 | 8 | 68 | 40 | 68 | 52 |
| | Pot life | O | O | O | O | O | O | O | O | O | X |
| | Squareness ratio | 0.87 | 0.87 | 0.86 | 0.85 | 0.87 | 0.68 | 0.77 | 0.73 | 0.77 | 0.77 |
| | Durability | O | O | O | O | X | X | X | O | X | Δ |
| | Crosslinking property | O | O | O | O | X | O | X | O | X | O |
| | Running property | O | O | O | O | X | O | X | O | X | O |

EXAMPLE 5

A vinyl chloride copolymer (k) comprising the epoxy group content of 4% and the vinyl chloride content of 82% was prepared by suspension polymerization of allylglycidyl ether and vinyl chloride, using azobisisobutyronitrile as a radical generator. This vinyl chloride copolymer (k) (100 parts) and 7 parts of maleic acid ($pKa_1$ 1.9 and $pKa_2$ 6.2) were dissolved in 160 parts of methyl ethyl ketone. The solution was mixed with stirring at 65° C. for 6 hours, and then, cooled to give a solution of a resin (K).

EXAMPLE 6

A vinyl chloride copolymer (l) comprising the epoxy group content of 3.6% and the vinyl chloride content of 75% was prepared by emulsion polymerization of vinylcyclohexene monooxide, vinyl chloride and vinyl acetate. This vinyl chloride copolymer (l) (100 parts), 2 part of malonic acid ($pKa_1$ 2.8 and $pKa_2$ 5.7), 4 parts of 2-acrylamide-2-methylpropanesulfonic acid ($pKa_1$ 2.0) and 0.003 part of methoxyhydroquinone were dissolved in 160 parts of dimethylformamide. The solution was mixed with stirring at 65° C. for 6 hours, and then, poured into water. The precipitated resin was recovered, and dried to obtain a resin (L).

EXAMPLE 7

A vinyl chloride copolymer (m) comprising the epoxy group content of 3.0% and the vinyl chloride content of 80% was prepared by solution polymerization of butadiene monoxide, vinyl chloride and acrylonitrile in a mixed solvent of methyl ethyl ketone and toluene. Citraconic acid ($pKa_1$ 2.4 and $pKa_2$ 6.2) (5 parts) was added to 300 parts of the vinyl chloride copolymer (m) (solids concentration 33%). The resulting solution was mixed with stirring at 60° C. for 12 hours to give a solution of a resin (M).

COMPARATIVE EXAMPLE 7

A vinyl chloride copolymer comprising the epoxy group content of 4% and the vinyl chloride content of 80% was prepared by suspension polymerization in the same way as in Example 5 except that glycidylacrylate was used instead of allylglycidyl ether. The copolymer was subjected to the same operation as in Example 5 to give a solution of a resin (N).

COMPARATIVE EXAMPLE 8

Operation in Example 6 was repeated except that adipinic acid ($pKa_1$ 4.4 and $pKa_2$ 5.3) was used instead of malonic acid, and a solution of a resin (O) was obtained.

COMPARATIVE EXAMPLE 9

A solution of a resin (P) was obtained in the same way as in Example 6 except that acrylic acid (pKa 4.3) was used instead of 2-acrylamide-2-methylpropanesulfonic acid.

The properties of the resins obtained in Examples 5 to 7 and Comparative Examples 7 to 9 are summarized in Table 2. In Table 2, the properties of the epoxy group-containing vinyl chloride copolymers (k), (l) and (m) used in Examples 5, 6 and 7 are also shown.

Magnetic coating composition and magnetic recording media produced by using these resins were tested and evaluated for their properties. The results are shown in Table 2. The evaluation methods are the same as in Table 1.

than 10,000 double bond equivalents of an unsaturated acid ester group.

2. The magnetic coating composition of claim 1 wherein the resin has an average degree of polymerization of 100 to 900.

3. The magnetic coating composition of claim 1 wherein the resin contains at least 60% by weight of vinyl chloride.

4. The magnetic coating composition of claim 1 wherein the resin contains 0.1 to 4.0% by weight of the hydrophilic group, as —COO, —$SO_3$, —$SO_4$, —$PO_3$ or —$PO_4$ group, per the resin.

5. The magnetic coating composition of claim 1 wherein the unsaturated acid ester group is derived from an unsaturated acid selected from a halogen-substituted (meth)acrylic acid, an unsaturated sulfonic acid, an unsaturated monoester of sulfuric acid, an unsaturated diester of phosphonic acid, maleic acid, citraconic acid, fumaric acid, mesaconic acid endomethylene-tetrahydrophthalic acid, methyl cyclohexene dicarboxylic acid and itaconic acid.

6. The magnetic coating composition of claim 1 wherein the resin is obtained by reacting a vinyl chloride polymer having at least one hydrophilic group selected from the group of COOM, $SO_3M$, $SO_4M$, $PO_3M_2$ and $PO_4M_2$ (wherein M represents hydrogen, an alkali metal or ammonium) and an epoxy group with an unsaturated acid having a pKa of not more than 3.5.

7. The magnetic coating composition of claim 6 wherein the content of the epoxy group is above 0.5% by weight per the vinyl chloride polymer.

8. The magnetic coating composition of claim 6 wherein the unsaturated acid is selected from the group of a halogen-substituted (meth)acrylic acid, an unsaturated sulfonic acid, an unsaturated monoester of sulfuric acid, an unsaturated diester of phosphoric acid, maleic acid, citraconic acid, fumaric acid, mesaconic acid, endomethylene-tetrahydrophthalic acid, methyl cyclohexene dicarboxylic acid and itaconic acid.

TABLE 2

| | | Example | | | Comparative example | | | | | |
|---|---|---|---|---|---|---|---|---|---|---|
| | | 5 | 6 | 7 | 7 | 8 | 9 | 10 | 11 | 12 |
| Properties of the resin | Sample | K | L | M | N | O | P | k | l | m |
| | Vinyl chloride (wt. %) | 79 | 72 | 77 | 80 | 73 | 74 | 82 | 75 | 80 |
| | Double bond equivalent | 2000 | 5500 | 3000 | 4000 | 5500 | — | — | — | — |
| | Hydrophilic group (wt. %) | 2.5 | 0.7 | 1.5 | 1.2 | — | 0.7 | *4.0 | *3.6 | *3.0 |
| | Degree of polymerization | 240 | 280 | 360 | 240 | 270 | 280 | 220 | 260 | 350 |
| Properties of the magnetic coating composition or magnetic recording medium | Dispersion stability | O | O | O | X | X | O | X | X | X |
| | Gloss (%) | 95 | 97 | 92 | 28 | 30 | 99 | 30 | 32 | 8 |
| | Pot life | O | O | O | O | O | O | O | O | O |
| | Squareness ratio | 0.87 | 0.89 | 0.87 | 0.70 | 0.70 | 0.89 | 0.70 | 0.70 | 0.67 |
| | Durability | O | O | O | Δ | Δ | X | X | X | X |
| | Crosslinking property | O | O | O | Δ | O | X | X | X | X |
| | Running property | O | O | O | Δ | O | X | X | X | X |

*Amount of the epoxy group (wt. %)

We claim:

1. An electron-beam reactive magnetic coating composition for use in magnetic recording media comprising a magnetic powder and a polymer resin as a binder therefor, the polymer resin containing vinyl chloride as a main component and having at least one hydrophilic group selected from the group of COOM, $SO_3M$, $SO_4M$, $PO_3M_2$ and $PO_4M_2$ (wherein M represents hydrogen, an alkali metal or ammonium) and not more 9. The magnetic coating composition of claim 1 wherein the resin is obtained by reacting an epoxy group-containing vinyl chloride polymer with (a) a polybasic unsaturated acid and/or (b-1) a monobasic unsaturated acid and (b-2) a polybasic saturated acid, the acids (a) and (b-1) having a pKa of not more than 3.5.

10. The magnetic coating composition of claim 9 wherein the content of the epoxy group is above 0.5% by weight per the vinyl chloride polymer.

11. The magnetic coating composition of claim 9 wherein the polybasic unsaturated acid (a) is selected from the group of maleic acid, citraconic acid, fumaric acid, mesaconic acid, endomethylene-tetrahydrophthalic acid, methyl cyclohexene dicarboxylic acid and itaconic acid.

12. The magnetic coating composition of claim 9 wherein the monobasic unsaturated acid (b-1) is selected from the group of a halogensubstituted (meth)acrylic acid, an unsaturated sulfonic acid, an unsaturated monoester of sulfuric acid and an unsaturated diester of phosphoric acid.

13. The magnetic coating composition of claim 9 wherein the polybasic saturated acid (b-2) is selected from the group of a polycarboxylic acid and a sulfocarboxylic acid.

* * * * *